United States Patent [19]

Engel et al.

[11] 3,972,599

[45] Aug. 3, 1976

[54] METHOD AND APPARATUS FOR FOCUSSING LASER BEAMS

[75] Inventors: Simon L. Engel, Sunnyvale, Calif.; Laurence R. Peters, Peoria, Ill.

[73] Assignee: Caterpillar Tractor Co., Peoria, Ill.

[22] Filed: Sept. 16, 1974

[21] Appl. No.: 506,451

[52] U.S. Cl. .............................. 350/294; 219/121 L; 350/293
[51] Int. Cl.² .......................................... G02B 5/10
[58] Field of Search ................. 350/96 T, 293–296; 331/94.5, DIG. 1; 219/121 L, 121 LM

[56] References Cited
UNITED STATES PATENTS

| 2,759,393 | 8/1956 | McLeod | 350/96 T UX |
| 3,621,198 | 11/1971 | Herbrich | 219/121 L |
| 3,696,230 | 10/1972 | Friedrich | 219/121 L |

OTHER PUBLICATIONS

McLeod, Journal of the Optical Society of America, vol. 44, No. 8, Aug., 1954, pp. 592–597.

*Primary Examiner*—John K. Corbin
*Assistant Examiner*—F. L. Evans
*Attorney, Agent, or Firm*—Phillips, Moore, Weissenberger, Lempio & Strabala

[57] ABSTRACT

A method of focussing a laser beam having a ring-shaped cross-section to provide a depth of focus for use in cutting and the like, in which the laser beam is converged to and through a focus by reflection from a concave mirror, and in which the diverging laser beam emanating from the focus is passed into an axicon having a substantially cylindrical inner reflective surface for reflecting the diverging laser beams back to an elongated focus. In its apparatus form, focussing means is provided together with a substantially cylindrical axicon positioned to intercept said diverging laser beam and to bring it back to a focus along an extended axis. The cylindrical axicon is preferably formed from a pair of telescoped tubular members having a closed annular space therein for receiving a cooling fluid, with the inner cylinder having its inner surface highly polished and/or coated with some material to minimize the absorption of the incident laser beam.

9 Claims, 2 Drawing Figures

U.S. Patent   Aug. 3, 1976   3,972,599
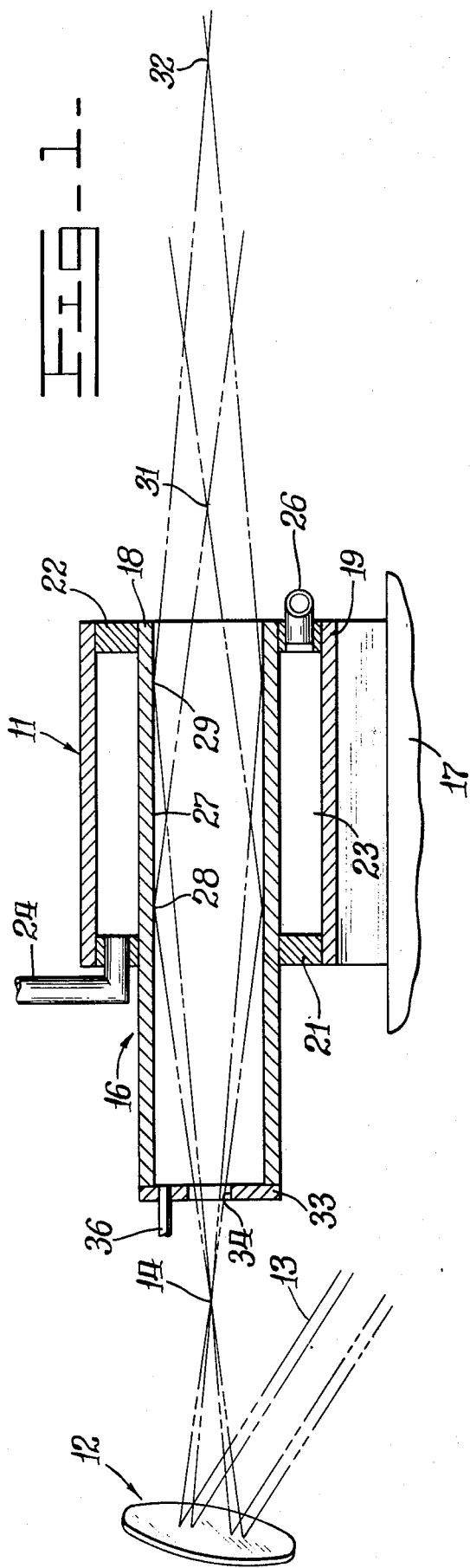
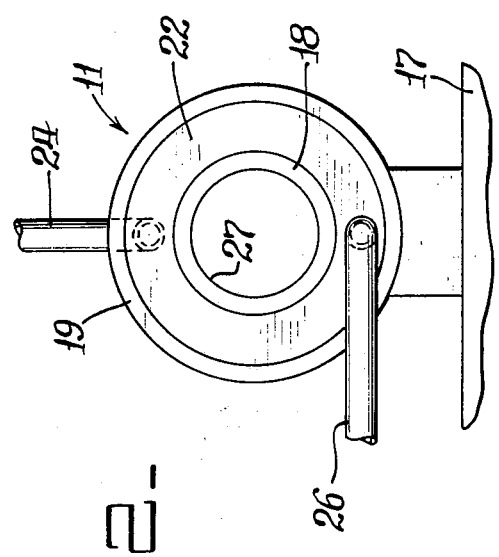

METHOD AND APPARATUS FOR FOCUSSING LASER BEAMS

BACKGROUND OF THE INVENTION

High powered carbon dioxide lasers are commonly employed for industrial metal working operations such as welding and cutting. In such operations, the annular laser beam is reflected from a concave mirror and focussed so that the energy is concentrated at a relatively small spot. One of the difficulties encountered in such systems is that the depth of field obtained at the focal point of a mirror having a small f-number is very small. This makes the positioning of the work piece very critical, and also renders it difficult to cut thick pieces.

It has been suggested to overcome this difficulty by utilizing mirrors having a higher f-number to increase the effective depth of focus. However, the utilization of higher f-numbers causes additional problems since the work piece must be spaced a greater distance from the laser apparatus. This not only increases the floor area required for operating the laser, but requires stringent safety precautions to insure a safe operation thereof. Accordingly, it is desirable to provide a method of increasing the depth of focus of such concentrated laser beams without unduly enlarging the apparatus employed.

SUMMARY OF THE INVENTION

The present invention relates to a method and apparatus for focussing laser beams in such a way that the depth of focus is relatively long compared to the width of focus, and more particularly to such a method and apparatus suitable for focussing high-powered carbon dioxide lasers having a ring-shaped cross-section to provide an increased depth of focus thereof.

Thus, it is a primary object of the present invention to provide a method and apparatus for focussing a laser beam to a concentrated energy form in which the focussed laser beam has a relatively large depth of focus, without unduly increasing the size of the focussing apparatus nor the distance through which the laser beam must travel.

Another object of the invention is to provide a method and apparatus of the character described in which a depth of focus is provided which is especially suitable for cutting and welding operations.

Another object of the invention is to provide an apparatus of the character described, which is constructed of a minimum number of parts, and which is absolutely reliable in operation.

Further objects and advantages will become apparent as the specification progresses, and the unusual features of the invention will be more fully defined in the claims attached hereto.

In accordance with the method form of the invention, a laser beam having a ring-shaped cross-section is focussed by first causing the laser beam to converge to a focus through suitable focussing means, and then passing the diverging laser beam emanating from the point of focus to an axicon capable of refocussing the diverging laser beam back to a focus which extends along a line segment on the axis of the laser beam. The axicon is preferably a reflecting device having an inner reflective surface of a substantially cylindrical shape. This reflective surface is provided on the inner surface of a tubular member, which is positioned to receive the laser. Specifically, the forward end of the tube will receive the outer portion of the diverging laser beam, and the far end of the tube will receive the diverging inner portion of the ring-shaped laser-beam whereby the entire laser beam is redirected back toward the axis. The reflective surface should be circular in cross-section, and is preferably substantially cylindrical. In other words, the axicon should have a circular, cylindric surface, or slightly frustroconical surface adapted for internal reflection.

The means for converging the laser beam is preferably a fluid, cooled, concave mirror similar to that now used in the art for bringing laser beams to a focus. However, the concave, generally spherical mirror should have a relatively low f-number and should be less than about f-10. By utilizing a mirror having an f-7 configuration, a typical laser beam may be focussed to a spot having a diameter of 0.04 inch. This dimension is good for welding and cutting, but ordinarily would have a penetration of the order of a quarter of an inch. By first passing the beam through an axicon in accordance with this invention, there will still be considerable concentration at about a 0.04 inch spot, but over a considerable depth of focus. In this way, cutting and welding can be achieved on relatively thick materials, or on materials which need not be placed so critically at the work station.

The exact characteristics of the concentrated laser beam will depend on the f-number of the mirror, the diameter of a reflecting surface on the axicon, and the configuration of the axicon; i.e., the deviation from cylindrical toward conical. With these parameters available, it is possible to provide an improved focus on a laser beam with a minimum of apparatus.

In fact, the only elements of apparatus needed in addition to the source of the laser beam is a suitable reflecting mirror, and an axicon constructed in accordance with the invention. Of course, these elements should be suitably mounted for the proper optical coordination.

In its apparatus form, the mirror is typically mounted with suitable adjusting means so that the distance of the mirror from the axicon may be adjusted as well as the angle of alignment thereof so that the mirror may receive the laser beam from a suitable laser beam source and direct it into exact position into the axicon and thence to the work piece. A suitable mounting for a concave mirror in accordance with the invention would be a mounting similar to that described in the copending application of Simon Leslie Engel entitled "Laser Beam Shaping Arrangement", U.S application Ser. No. 487,914 filed July 12, 1974 and assigned to the same assignee as this application.

BRIEF DESCRIPTION OF THE DRAWING

A preferred form of the invention is illustrated in the accompanying drawing forming a part of this description, in which:

FIG. 1 is an elevational view, partly diagrammatic and partly in the section, illustrating a preferred form of the invention; and FIG. 2 is an end view of the apparatus shown in FIG. 1.

While only the preferred form of the invention is shown, it should be understood that various changes or modifications may be made within the scope of the claims attached hereto without departing from the spirit of the invention.

DETAILED DESCRIPTION OF THE PREFERRED EMBODIMENT

Referring more particularly to the drawing, there is shown in FIG. 1 an apparatus 11 constructed in accordance with the invention. The apparatus comprises means 12 for focussing a laser beam 13 through a point 14, and a cylindrical axicon 16 positioned to receive the diverging laser beam 13 emanating from the point 14. Preferably, the means 12 is a concave reflecting mirror of low-f-number say between f-2 and f-10 and will be mounted on the same frame as the cylindrical axicon 16 in accordance with known method of mounting and positioning reflecting mirrors.

The cylindrical axicon 16 is mounted on a suitable frame 17 and comprises an inner cylinder 18 concentrically disposed within an outer cylinder 19. The cylinders 18 and 19 are separated by a pair of ring members 21 and 22, which cooperate with the cylinders to form an annular chamber 23. The annular chamber is provided to carry cooling fluid, which is brought in through conduit 24 and removed through conduit 26. The cooling fluid is circulated and cooled by external means (not shown), but which are conventional for circulating cooling fluids through optical devices.

In addition, the inner cylinder 18 has a surface 27 which is highly polished or coated with a suitable material to minimize the absorption of the incident laser beam. In this way, the amount of energy absorbed by the axicon is minimized, and such energy is removed by the cooling fluid so as to prevent undue heat buildup within the axicon.

In operation, the laser beam 13 will be reflected from mirror 12, pass through the focal point 14, and then impinge upon reflective coating 27 of axicon 17. The outer portion of laser beam 13 will impinge upon the axicon at the forward end thereof as indicated by point 28, and the inner portion of the laser beam will impinge upon the axicon at point 29 at the far end thereof. As shown diagrammatically in FIG. 1, the outer portion of laser beam 13 then converges again to a point at 31, and the inner portion of laser beam 13 converges again at a point 32. From the diagram it is seen that all of the laser beam is reflected within the axicon and directed to a concentrated focal area between points 31 and 32 along the axis of travel of the laser beam. Accordingly, the work piece to be operated upon will be placed along the axis at this position, and it will be seen that excellent penetration may be achieved by utilizing the axicon of this invention.

A plate 33 having a centrally disposed aperture 34 therein is secured to the end of the inner cylinder 13 adjacent the mirror 12 with a stream of high pressure gas being introduced into the inner cylinder through a conduit 36. The purpose of the gas is to provide a protective environment for the work operation, prevents fumes and smoke generated by the work operation from entering the inner cylinder, and provides additional cooling of the inner cylinder.

Although a perfectly cylindrical axicon is shown, it will be appreciated that the axicon may be slightly conical with the end opposite the mirror end being of smaller diameter than the front end. However, the far end of the axicon is preferably of larger diameter than the converging outer laser rays so that the inner core will strike at a point beyond the point 31. However, it will be appreciated that by changing the configuration of the axicon, the depth of focus may be decreased, if desired, in order to increase the concentration of energy along the axis. It will also be appreciated that the depth of focus may be changed by changing the diameter of the cylindrical axicon, and by changing the f-number of the mirror.

Therefore, different types of operations may be carried out at optimum conditions by changing the axicon or mirror or both. Accordingly, it is desirable to utilize suitable adjustable mountings to accommodate changes of components as well as to provide for optical alignment.

From the foregoing description, it is seen that a method and apparatus is provided for focussing a laser beam which provides excellent concentration of energy at a work station, yet which provides the desired depth of focus. It is also seen that these characteristics are obtained in an apparatus having a minimum of parts which are capable of considerable variation in operating characteristics in order to provide an optimum for any operation which is to be carried out by a laser beam.

What is claimed is:

1. A method of focusing a laser beam having a ring-shaped cross-section comprising the steps of converging the laser beam through a focal point, and passing the diverging beam into one end of a tubular axicon having an internal reflecting surface positioned to direct the laser beam back to an elongated focus beyond the other end thereof.

2. The method of focussing a laser beam as defined in claim 1, in which the axicon is cylindrical.

3. The method of focussing a laser beam as defined in claim 1, in which the axicon is large enough to reflect the entire diverging laser beam.

4. An apparatus for providing an elongated axial focus of a laser beam, comprising means for focusing the laser beam through a point and thence in a diverging manner, and an axicon having an active surface of substantially circular cross-section positioned to receive the diverging laser beam at one end thereof and focus said beam along an extended axis of given length beyond the other end thereof.

5. An apparatus for providing an elongated axial focus as defined in claim 4, in which the axicon is formed by a hollow substantially cylindrical member open at both ends with the inner surface thereof having a highly reflective surface.

6. An apparatus as defined in claim 5, in which the cylindrical member is carried in an outer housing formed to define a space therebetween for receiving cooling fluid.

7. An apparatus as defined in claim 6, in which the housing is also cylindrical and the space for receiving cooling fluid is annular in shape.

8. An apparatus as defined in claim 4, which also comprises means for directing a stream of gas through the central portion of the axicon.

9. An apparatus as defined in claim 8, in which the stream of gas is moved through the axicon in the same direction as the laser beam.

* * * * *